United States Patent [19]

Chien

[11] Patent Number: 5,352,767
[45] Date of Patent: Oct. 4, 1994

[54] ALPHA-OLEFIN/CARBON MONOXIDE ATTENUATING COPOLYMERS AND IMPROVED CATALYST AND METHOD FOR COPOLYMERIZING THE SAME

[75] Inventor: James C. W. Chien, Amherst, Mass.

[73] Assignee: University of Massachusetts - Amherst, Mass.

[21] Appl. No.: 180,698

[22] Filed: Jan. 13, 1994

Related U.S. Application Data

[63] Continuation of Ser. No. 818,061, Jan. 8, 1992, abandoned.

[51] Int. Cl.$^5$ ............................................. C08G 67/02
[52] U.S. Cl. ..................................................... 528/392
[58] Field of Search ......................................... 528/392

[56] References Cited

U.S. PATENT DOCUMENTS

| | | | |
|---|---|---|---|
| 4,804,738 | 2/1989 | Drent | 528/392 |
| 4,808,699 | 2/1989 | Van Broekhaven et al. | 528/392 |
| 4,824,934 | 4/1989 | Van Broekhoven | 528/392 |
| 4,824,935 | 4/1989 | Van Broekhoven et al. | 528/392 |
| 4,831,113 | 5/1989 | Van Broekhoven et al. | 528/392 |
| 4,965,341 | 10/1990 | Van Doorn et al. | 528/392 |
| 5,019,645 | 5/1991 | Wong et al. | 528/392 |
| 5,041,530 | 8/1991 | Van Doorn et al. | 528/392 |
| 5,070,184 | 12/1991 | Wong et al. | 528/392 |
| 5,122,579 | 6/1992 | Pino et al. | 528/392 |

*Primary Examiner*—John Kight, III
*Assistant Examiner*—Shelley A. Dodson
*Attorney, Agent, or Firm*—Rines and Rines

[57] ABSTRACT

Novel and previously contra-indicated alpha-olefin/carbon monoxide alternating copolymers are disclosed, together with polymerization methods and novel catalysts therefor.

14 Claims, No Drawings

ALPHA-OLEFIN/CARBON MONOXIDE ATTENUATING COPOLYMERS AND IMPROVED CATALYST AND METHOD FOR COPOLYMERIZING THE SAME

This application is a file wrapper continuation of application Ser. No. 818,061 filed Jan. 8, 1992 abandoned.

The present invention relates to alternating copolymers useful for a myriad of drawn fiber, blown film, and extruded and molded objects, being particularly concerned with alternating copolymers of alpha-olefins and carbon monoxide of high molecular weight and narrow molecular weight distribution, and catalysts useful to copolymerize the same.

BACKGROUND OF INVENTION

Ethylene/carbon monoxide (CO) copolymers have heretofore been developed, employing Pd and Ni catalysts, such as $(Ph_3P)_2Pd(CH_3CN)_2(BF_4)_2$/acid and $(Ph_2P(CH_2)_3PPh_2)Pd(OAc)_2$/acid, for effecting the alternating copolymerizations of the same. Such copolymers are described, for example, in U.S. Pat. Nos. 3,835,123 (K. Nozaki), 3,984,388 (T. J. Shryne and H. V. Holler), and 4,976,911 (D. M. Fenton) of Shell Development Co.

Ethylene and carbon monoxide are extremely cheap raw materials; their copolymers are potentially inexpensive plastic material, if efficient catalysts can be found. But the ethylene/CO alternating copolymer has inherently very high melting temperatures of the order of greater than 268° C. as well as other undesirable crystalline and other physical characteristics.

It has accordingly been proposed to combine an alpha-olefin as a third monomer (termonomer) for such ethylene/carbon monoxide polymers, among other reasons, to reduce such high melting temperatures. Terpolymers of this type are described, for example, by van Broekhoven in European Patent Application 0213671 A1, 11/03/87, disclosing the incorporation of a propylene, butene-1, and octane-1 as termonomers and in European Patent Application 257663 A2, 02/03/88, disclosing dodecene-1 as the termonomer; by E. Drent in European Patent Application 0315279 A1, 10/05/89 and earlier in European Patent Application 0265159 A1, 20/04/88, disclosing a termonomer of 2-methylpropene-1, styrene, norbornene, norbornadiene and dicyclopentadiene as the other termonomers in European Patent Application 0229408 A1, 22/07/87; by Pino in European Patent Application 028218 A2, 05/10/88, also disclosing ethylene/carbon monoxide terpolymers, this time comprising 4-methoxystyrene, 4-chlorostyrene, 2-methylstyrene and 4-methylstyrene as the termonomers.

While potentially desirable, it was apparently indicated in the understanding in the art of polymer chemistry, that it would be difficult or extremely difficult to achieve an alternating copolymer of just alpha-olefins and carbon monoxide. Among the reasons such an alternating copolymer was considered unattainable, was, firstly, the affinity in the required polymerization catalysts for hydride ion by group VIIIa transition elements, and the labile β-hydrogen present in the propagation chain of the alpha-olefin bond to the metal— such seeming to preclude the synthesis of alpha-olefin/carbon monoxide alternating copolymers of useful molecular weight. Secondly, the alpha-olefin/carbon monoxide alternating copolymers have geometric and stereo isomerisms which are absent for ethylene/carbon monoxide alternating copolymers. The geometric isomers arise from primary (p) or secondary (s) insertions of the olefins; for instance,

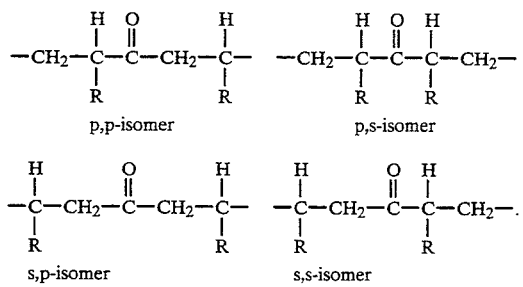

Regioselectivity in monomer placement determines the regioregularity of α-olefin/carbon monoxide alternating copolymer. The stereoisomers arise from the stereochemistry of the placement of the prochiral alpha-olefins,

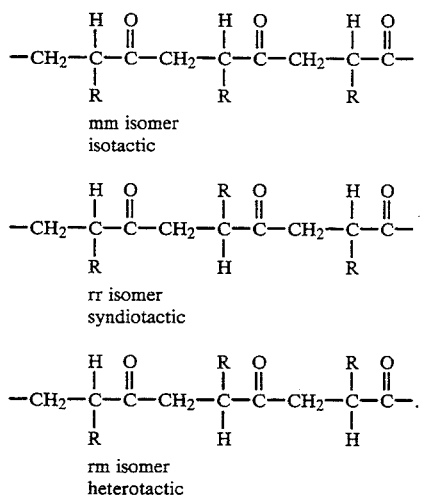

Stereoselectivity by the catalyst for the prochiral monomer determines the stereoregularity of the alpha-olefin/carbon monoxide alternating copolymers. If the alternating copolymer has low regio- and stereo-regularities, it will be an amorphous substance. It can be a semicrystalline material if the polymer chains are highly regio- and stereo-regular.

Rather startlingly, it has now been discovered that such apparent contraindications can be obviated, and that, particularly through the use of novel catalysts and techniques, very desirable, high molecular weight (MW) and narrow molecular weight distribution alpha-olefin/carbon monoxide alternating copolymers with controlled microstructural regularity can be achieved with the resulting copolymers having relatively low melting temperatures of the order of 160° C. and desirable amorphous structures.

OBJECTS OF INVENTION

It is, accordingly, a principal object of the present invention to provide novel alpha-olefin/carbon monoxide alternating copolymers.

A further object is to provide a novel catalytic method and catalyst particularly suitable for the alternating copolymerization of alpha-olefin and carbon monoxide with controlled regio- and stereo-selectivity.

Other and further objects will be described hereinafter and are more particularly delineated in the appended claims.

SUMMARY OF INVENTION

In summary, however, from one of its important aspects, the invention embraces novel alternating copolymers of alpha-olefin and carbon monoxide comonomers. Such are formed by low to medium pressure reaction of a solution of alpha-olefin monomer with carbon monoxide in the presence of a catalyst comprising a divalent group VIII transition metal, a bidente ligand with group atoms of the periodic table for chelation referred to hereafter as bidente ligand, a coinitiator, and inert counter ions.

Preferred and best mode embodiments, polymerization method steps and catalysts are hereinafter described in detail.

DESCRIPTION OF PREFERRED EMBODIMENTS OF INVENTION

Underlying the novel result of synthesizing the above-described alpha-olefin/carbon monoxide alternating copolymers having controlled structural regularities, is the discovery of a novel type of catalyst that, in the polymerization method of the invention, obviates the deleterious affinity for hydride ion by group VIII transition elements in the catalyst and the labile $\beta$-hydrogen present in the propagation chain of the alpha-olefin bond to metal that heretofore precluded such synthesis.

CATALYST

The novel type of catalyst found, in accordance with the present invention, thus capable of copolymerizing alternating alpha-olefin, of linear or branched structure comprising three to twenty carbon atoms, and carbon monoxide into novel alternating copolymers is, generically,

[L.M.S]$^{+2}$ 2X$^-$/A, where (1) M is a transition metal ion selected from group VIIIa of the periodic table, characterized by a square planar complexation geometry such as Pd(II), Ni(II) and the like;

(2) L is a bidente ligand containing two heteroatoms, having a lone pair of electrons and selected from groups Vb and VIb of the periodic table, linked by alkylenic, alicyclic, or aromatic moiety of suitable length n of 1 to 7 (preferably 3 to 5) carbon atoms in this linkage, and a geometry suitable for chelating coordination of the heteroatoms with cis geometry in the xy plane of M; and the said moiety being linear, spiro, or condensed cyclic type to impart either stereo-fluxionality or conversely stereorigidity to L, and the other groups bonded to the heteroatoms being selected from the aromatic phenyl, naphthyl, biphenyl, indenyl groups which may contain alkyl substitutes of four to twenty carbon atoms to impart solubility of the said catalyst in the polymerization medium;

(3) S is a labile coordinative molecule such as CH$_3$CN, tetrahydrofuran, dialkylethers, pyridine and other nitrogenous compounds or a solvent molecule of aliphatic or aromatic halogen compounds of 1 to 10 carbon atoms and 2 to 6 halogen atoms, sulfolane, alkyl sulfoxides, alkyl sulfones and the like;

(4) X$^-$ is a suitable anion such as Cl$^-$, BF$_4^-$, B(C$_6$H$_5$)$_4^-$, and the like;

(5) A is one or more activators selected from linear or branched, primary or secondary alcohols of one to twenty carbon atoms which can contain an aromatic group; an organic oxidizing molecule of quinoid type comprised of six to fourteen carbon atoms; and an oxidizing metal ion of high oxidation state.

A most useful form of this catalyst is [Ph$_2$P(CH$_2$)$_n$PPh$_2$.Pd. (solv)$_2$]$^{+2}$2X$^-$, where n is from 1 to 6, preferably 3 to 5, and solv is a solvent molecule selected from the group consisting of CH$_3$CN and tetrahydrofuran. Other specific species successfully used are set forth in the later-presented Examples 1-6.

The new catalysts were found admirably to catalyze the alternating copolymerization of alpha-olefin with carbon monoxide under mild conditions, later described. The resulting alternating copolymers, as before intimated, were discovered to possess high molecular weight and narrow molecular weight distribution. The alternating propylene/carbon monoxide copolymer hereinafter presented is a thermoplastic elastomer, the $T_m$ and $T_g$ (glass transition temperature) of which varied with the catalyst. The alternating copolymers of CO and alpha-olefins of 4 to 20 carbon atoms are elastomers with the magnitude of $T_g$ dependent on the structure of the alpha-olefin.

This is, however, to be contrasted from prior catalysts such as (Ph$_2$P(CH$_2$)$_3$PPh$_2$)Pd(OAc)$_2$/acid found useful in the before-mentioned Shell ethylene/carbon monoxide and termonomer alpha-olefin polymerizations. Such prior catalysts not only cannot alternatingly copolymerize alpha-olefin and carbon monoxide, but they are inactive in the absence of an acid. The novel catalyst of the present invention, to the contrary, not only does not require an acid, but, in fact, the presence of an acid has the undesirable effect of excessive lowering of copolymer molecular weight.

CATALYST PREPARATION

In accordance with the discovery of the invention, Pd metal is reacted with NOBF$_4$ in acetonitrile. Subsequent complexation with a bidente ligand L produced the catalyst. The choice of L can significantly influence the structure of the copolymer and its properties as well as the copolymerization yields as has been discovered with the following L ligands:

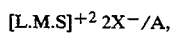  1

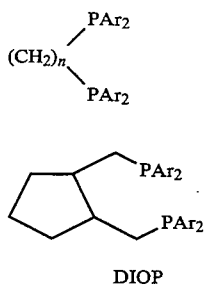  2

DIOP

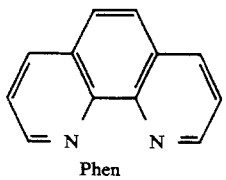

Phen where, as before stated, n=1 to 7; Ar=phenyl, alkylphenyl, naphthyl, alkylnaphthyl; phen=phenanthrene, and alkylphenanthrene; the alkyl substituent having the number of carbon atoms necessary to impart solubility in the polymerization medium (between two and eighteen).

EXAMPLE 1

A pressure reactor was charged under inert atmosphere with 150 ml of $CH_2ClCH_2Cl$, 1 ml of methanol, 0.02 mmol of $[Ph_2P(CH_2)_3PPh_2]Pd.^{+2}(CH_3CN)_2.2BF_4^-$, 50 ml of propylene, and 800 psi of CO. The polymerization was conducted at 50° C. After a day, the unreacted monomers were vented. The product was precipitated and purified, yielding 3.0 g of copolymer, which was found to have $M_n=3.3\times10^4$, $M_w=5.0\times10^4$, and $M_w/M_n=1.5$ (where $M_n$ is number average molecular weight and $M_w$ is weight average molecular weight). The copolymer had $T_g=25.3°$ C., a relatively low $T_m=125°$ C., and $H_f=13.2$ cal $g^{-1}$ ($H_f$ is the enthalpy of fusion). High resolution $^{13}C$-NMR and elemental analysis showed the copolymer to have the alternating structure previously mentioned, but low regio-regularity of 55% of head-to-tail propylene units. The regioselectivity ratio of primary to secondary insertion is only 2.4.

EXAMPLE 2

Propylene and CO was copolymerized using 0.02 mmol of $[Ph_2P(CH_2)_4PPh_2]Pd^{+2}(CH_3CN)_2.2BPh_4^-$, 1 mL of isopropanol and other conditions described in Example 1. The resulting alternating copolymer is 79% regioregular with regioselectivity ratio of 7.4. The copolymerization yield was 3.5 g. The product has $M_n=4.5\times10^4$ and $T_m=140°$ C.

EXAMPLE 3

In a pressure reactor given in Example 1, the catalyst $[(-)DIOP]Pd^{+2}(CH_3CN)_2.2BF_4^-$/s-butanol was used to copolymerize propylene and CO. The alternating copolymer formed was exceedingly regioregular with 98% head-to-tail and a high $T_m$ of 140° C.

EXAMPLE 4

Propylene and CO were copolymerized using 0.02 mmol each of Phen $Pd^{+2}(CH_3CN)_2 2B(C_6F_5)_4^-$ and benzoquinone, 1 mL of methanol and other conditions given in Example 1. Two g of alternating copolymer was obtained which is both regioregular and stereoregular. The polymer has a $T_m$ of 162° C.

EXAMPLE 5

A pressure reactor was charged with reactants as in Example 1, except the alpha-olefin employed was 20 ml of butene-1. Alternating butene-1 carbon monoxide copolymer was obtained in 2.2 g yield, which had $M_n=2.0\times10^4$.

EXAMPLE 6

A pressure reactor was charged with reactants as in Example 1, except the α-olefin was 50 ml of hexene-1. 2.0 g of alternating hexene-1/carbon monoxide copolymer was obtained with $M_n=2.5\times10^4$, $M_w=3.6\times10^4$, $M_w/M_n=1.4$ and $T_g=1.8°$ C.

With the discovery of the present invention, several unexpected and synergistic and beneficial effects have resulted.

The use of bidente ligand increases the stability of the catalyst with consequent improvement of copolymerization productivity hundreds of times over the catalysts based on monodente phosphine complexes.

If the coordinating group atoms are linked by a condensed ring such as the optically active (−)DIOP, phen, and the like, the bidente ligand is rigidly coordinated to one side of the palladium, the olefin is forced to occupy the other coordination site "cis" to the propagating chain, and the insertion reaction also continues on the "cis" side. This is believed to be the reason for the remarkable control of the before-mentioned regioregularity, including the alternating copolymer structure, and forcing an alternating structure which has been termed "tail-head" diad regulation (as distinguished from head-head or tail-tail sequences), somewhat as follows:

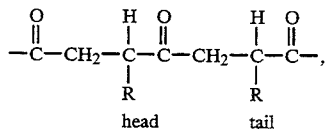

head      tail

The novel stereo- and regio-regulation of the alpha-olefin insertions by the catalysts of this invention have resulted in alternating copolymers of low melting temperature of the order of 125° C. to about 160° (2; (Examples 1, 2, 3 and 4), useful elastic, or thermoplastic elastomeric, or plastic properties and, with the catalysts of the invention, a remarkable control is achieved of the structural regularity of the copolymer, with regiospecific characteristics approaching unity of total regiospecificity (up to 0.98 at present).

As further contrasted from the ethylene/CO copolymers, the alternating alpha-olefin/CO copolymers of the invention are soluble in many common organic solvents such as chloroform, acetonitrile, acetone, etc. Methanol can be used as an agent for copolymer fractionation, moreover, since the solubility of the copolymers of the invention is poor in methanol, particularly for higher molecular weight fractions. It appears, furthermore, that the copolymerization of the alpha-olefin/CO alternating copolymer is a homogeneous system with a single propagation mechanism in view of a single mode of molecular weight distribution. The copolymers, as before stated, range in amorphous characteristics, having different possible structure sequences using catalyst systems which are not regiospecific or not stereospecific for α-olefin insertions. More regiospecific catalysts have been discovered which can produce alpha-olefin/CO alternating copolymers having thermoplastic elastomer characteristics. Even more unexpectedly, catalysts which can produce alternating propylene/CO copolymers of high structural regularity have been discovered. These catalysts have a bidente ligand L having a fused ring or a spiro moiety which fixes the L ligand with high stereorigidity and may at the same time shield the axial positions of the metal complex.

The various properties exhibited by the alpha-olefin/CO alternating copolymers are contrasted from the unvarying structure of the ethylene/CO alternating polymer which gives rise to the very different crystalline properties thereof and the very high melting transition temperatures. Ethylene is not a prochiral monomer like the alpha-olefins.

Another contrasting finding is that the pyrolysis of the ethylene/CO alternating copolymer produces 20–30% (weight) carbonaceous residues; whereas pyrolysis of the alpha-olefin alternating copolymers occurs cleanly and to completion.

Other alpha-olefin monomers may be substituted such as linear 1-alkenes which are higher homologs of hexene, branched 1-alkenes like 3-methyl-1-pentene, 4methyl-1-hexene, there being no theoretical reason why all such are not also useful. As will be observed, the alpha-olefin comonomers of the illustrative propylene, butene-1 and hexene-1 have 3, 4, and 5 carbon atoms in linear structure. In general, it is most desirable that the alpha-olefin comonomers have twenty or less carbon atoms for economical reasons.

Further modifications will occur to those skilled in this art and such are considered to fall within the spirit and scope of the invention as defined in the appended claims.

What is claimed is:

1. An alternating thermoplastic elastomeric copolymer of only an alpha-olefin comonomer and carbon monoxide comonomer formed by high pressure reaction of an acid-free solvent solution of alpha-olefin monomer with carbon monoxide in the presence of a catalyst comprising $[L \cdot M \cdot S] + 2_{2X_-}/A$, where M is a transition metal ion selected from groups VIIIa of the periodic table; L is a bidente ligand containing two heteroatoms having a lone pair of electrons and selected from groups Vb and VIb of the periodic table for cis-chelation with M and in which the two heteroatoms in L are linked by alkylene chains of 1 to 7 carbon atoms and linked by alicyclic or spiro moieties to provide both steriorigidity to the said heteroatoms and geometry inducive for said cis-chelation with M; S is a solvent molecule or an electron donating molecule; $X^-$ is an anion selected from the group consisting of $Cl^-$, $BF_4^-$, $B(C_6H_5)_4^-$, and $B(C_6F_5)_4$, and A is an activator selected from the alcohol group consisting of linear and branched, primary and secondary alcohols of 1 to 20 carbon atoms, with the copolymer terminated with the radical of the activator alcohol A.

2. An alternating thermoplastic elastomeric copolymer as claimed in claim 1 and in which the copolymer has a regioregularity of from about 55% to about 98%.

3. An alternating copolymer as claimed in claim 1 and in which the activator A includes organic oxidizing molecules of quinones comprised of 6 to 14 carbon atoms.

4. An alternating copolymer as claimed in claim 1 and in which the activator A includes an inorganic metal ion capable of oxidizing the transition metal ion M from neutral to divalent state.

5. An alternating copolymer as claimed in claim 1 in which the solvent S is selected from the labile coordination molecule group consisting of $CH_3CN$, tetrahydrofuran, dialkylethers, pyridine, aliphatic and aromatic halogen compounds of 1 to 10 carbon atoms and 2 to 6 halogen atoms, sulfolane, alkyl sulfoxides and alkyl sulfones.

6. An alternating copolymer as claimed in claim 1, in which the two heteroatoms in L are linked by condensed rings to provide both stereo-rigidity to the said heteroatoms and a geometry inducive for cis-chelation with M.

7. An alternating copolymer as claimed in claim 1, in which the two heteroatoms have other groups bonded comprised of one or two aromatic rings with or without alkyl substituents of four to sixteen carbon atoms.

8. An alternating copolymer as claimed in claim 1, and in which the said catalyst has an organic oxidant selected from derivatives of benzoquinone, naphthaquinone, anthraquinone, phenylene diimine with or without alkyl substitute of four to twenty carbon atoms.

9. An alternating copolymer as claimed in claim 1 and in which the alpha-olefin comonomer has up to twenty carbon atoms in one of linear or branched structures.

10. An alternating copolymer as claimed in claim 1 and in which the alpha-olefin comonomer is selected from the group consisting of propylene, butene-1, hexene-1 and decene-1.

11. An alternating copolymer as claimed in claim 1 and in which the catalyst formula is selected from the group consisting of $[Ph_2P(CH_2)_3PPh_2]Pd^{+2}(CH_3CN)_2.2BF_4^-$, $[Ph_2P(CH_2)_4PPh_2]Pd^{+2}(CH_3CN)_2.2BPh_4$, $[(-)DIOP]Pd^{+2}$ $(CH_3CN)_2.2BF_4^-$/s-butanol; and Phen $Pd^{+2}(CH_3CN)_2$ $2B(C_6F_5)_4$.

12. An alternating thermoplastic elastomeric copolymer of an alpha-olefin comonomer, selected from the group consisting of propylene, butene-1, hexene-1 and decene-1, and carbon monoxide comonomer formed by high pressure reaction of an acid-free solvent solution of only an alpha-olefin monomer with carbon monoxide in the presence of a polymerizing catalyst having an activator selected from the alcohol group consisting of linear and branched, primary and secondary alcohols of 1 to 20 carbon atoms, with the resulting copolymer thus having the radical of such alcohol attached, a relatively high molecular weight number average of the order of from $2 \times 10^4$ to $4.5 \times 10^4$ with a relatively low melting temperature of the order of 125° to 162° C. and regioregularity from 55% to 98%.

13. An alternating thermoplastic elastomeric copolymer as claimed in claim 12 and in which said alcohol is selected from the group consisting of methanol, isopropanol, and S-butanol.

14. An alternating thermoplastic elastomeric copolymer as claimed in claim 13 and in which the alpha-olefin comonomer is propylene and the said alcohol comprises methanol.

* * * * *